F. & B. LJUNGSTROM.
DEVICE FOR RESTRICTING AXIAL MOVEMENTS OF SHAFTS.
APPLICATION FILED FEB. 26, 1917.

1,224,882.

Patented May 1, 1917.

Inventors:
Fredrik Ljungström,
Birger Ljungström,
by Albert G. Davis
Their Attorney.

UNITED STATES PATENT OFFICE.

FREDRIK LJUNGSTRÖM AND BIRGER LJUNGSTRÖM, OF FINSPONG, SWEDEN, ASSIGNORS TO GENERAL ELECTRIC COMPANY, A CORPORATION OF NEW YORK.

DEVICE FOR RESTRICTING AXIAL MOVEMENTS OF SHAFTS.

1,224,882.    Specification of Letters Patent.    Patented May 1, 1917.

Application filed February 26, 1917. Serial No. 151,117.

*To all whom it may concern:*

Be it known that we, FREDRIK LJUNGSTRÖM and BIRGER LJUNGSTRÖM, subjects of the King of Sweden, residing at Finspong, in the Kingdom of Sweden, have invented certain new and useful Improvements in Devices for Restricting Axial Movements of Shafts, of which the following is a specification.

In connection with certain types of apparatus, notably elastic fluid turbines, devices are provided to restrict axial movements of the shaft or shafts. As commonly constructed these devices comprise a stationary cylinder containing a piston which is attached to and rotated by the shaft whose axial movements it is desired to restrict or dampen. A fluid, such as oil, is admitted to the cylinder on opposite sides of the rotating piston, which fluid is forced through suitably restricted valved passages from one end of the cylinder to the other as the shaft and piston move axially.

This construction is open to certain disadvantages. The rapid rotation of the piston causes the oil to heat and generate gases which interfere with the proper functioning of the parts. As the viscosity of the oil is greater cold than hot this gives rise to a greater damping effect in the one case than in the other. Further the slight wear of the sliding parts due to use gives rise to leakages which change the effect of the damping action, and it is difficult or impossible to adjust the parts to compensate therefor.

The object of the present invention is to provide a damping device which is free from the objections above noted and which is of simple and rugged construction.

In the following description reference will be made to the damping of axial movements of turbine rotor shafts but it is to be understood that the invention is not necessarily limited thereto since it is capable of wider application.

For a consideration of what we believe to be novel and our invention attention is directed to the accompanying description and claims appended thereto.

Figure 1:
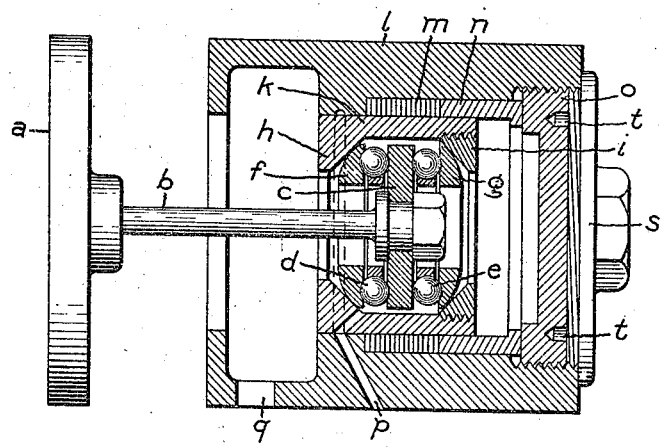
Figure 2:
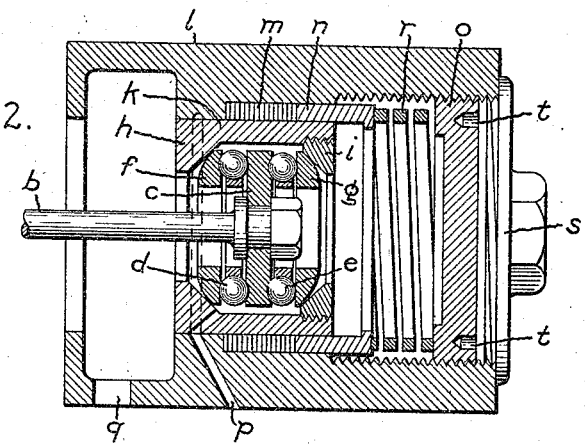

In the accompanying drawing which is illustrative of the invention Figure 1 is a longitudinal section of one form of the invention, and Fig. 2 is a similar section showing a means for automatically compensating for wear.

$a$ indicates a head or member whose axial movements are to be restricted or damped. In the present instance it is intended to be attached to or form a part of the rotating blade structure of an elastic fluid turbine. To the head or member is attached a small flexible shaft $b$, the right hand end of which is firmly attached to a disk $c$, forming a part of a slip-joint. On opposite sides of the disk are rows of hardened steel balls $d$ and $e$ located in ball races $f$ and $g$, forming the stationary part of the slip-joint. The outer surfaces of the ball races are made spherical and are seated on inwardly facing seats or parts $h$ and $i$ which are carried by the axially moving hollow piston $k$. The seat $h$ is or may be formed integral with the piston while the seat $i$ is made in the form of a ring nut and is screw threaded into the piston. The purpose of this latter arrangement is to permit the rotating disk $c$ and associated bearing balls to be mounted in place. The purpose of the rows of balls is to permit the disk $c$ to be rotated relatively to the piston and at the same time to transmit thereto axial movement of the turbine or other shaft. The spherical surfaces on the parts $f$ and $g$ permit the disk $c$ to adjust itself on the seats thereby compensating for any lack of alinement between the driving member $a$ and the piston and its inclosing cylinder. In other words the arrangement of the spherical surfaced parts $f$ and $g$ and the seats $h$ and $i$ forms a universal joint.

The piston is located within the cylinder $l$ which when in use is restrained by any suitable means from moving in any direion. The cylinder is counterbored for a portion of its length and located therein is a means for creating a certain amount of friction between the piston and the cylinder. As shown said means comprises a plurality of packing rings $m$ of any suitable character. Experience has demonstrated that leather is suitable for the purpose. In order to give the rings the necessary initial compression and also to adjust them to compensate for wear a follower $n$ is provided that fits the wall of the counter bore and engages the rings. This follower is forced into position by the nut $o$ which has suitable axially extending holes $t$ to receive a spanner wrench. The right hand end of the cylinder is closed by a screw threaded cover or nut $s$.

The peripheral surface of the piston and the surrounding parts are supplied with lubricant from a groove in the cylinder which communicates with the supply passage $p$. Any excess of lubricant escapes into the chamber at the left hand end of the cylinder, which has a drain $q$.

In Fig. 2 is shown a slight modification of the invention wherein a stiff coiled compression spring $r$ is interposed between the nut $o$ and the follower $n$, the construction otherwise being the same. The purpose of this spring is to maintain a substantially uniform pressure on the friction means and in this manner compensate for any wear of the leather rings. The type of spring and the tension to which it is subjected should be chosen with this in view.

The operation of the device is as follows:

When the turbine or other shaft is rotated the member $a$, shaft $b$ and disk $c$ also rotate, the latter between the rows of balls $d$ and $e$. In case the axis of the turbine or other driving shaft does not exactly coincide with the axis of the piston and its cylinder or the shaft does not run true for any reason the outer spherical surfaces of the ball races will swing or move a sufficient amount on their seats to compensate therefor. On the other hand any force exerted on the turbine or other shaft tending to move it axially in either direction will be resisted until such force is sufficient to overcome the friction exerted by the packing rings on the piston. In the latter case the shaft will of course move but will do so in a sluggish manner and thus prevent axial vibrations which might otherwise take place.

When the damping effect decreases below the desired value it is a simple matter to remove the outer cap and screw in the nut $o$ thus forcing the follower to compress the packing until the desired friction is reestablished. In case a spring of proper form is employed, as in Fig. 2, this adjustment will take place automatically.

The nut $i$ should be so adjusted as to eliminate any axial play of the balls in their races. If, however, any looseness or play does exist centrifugal force acting on the balls as they rotate with the disk will cause the balls to move outwardly and take up said play.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent is:

1. A device for suppressing axial oscillating movements of a rotating shaft, comprising a movable member connected with the shaft, a stationary member, a friction device interposed between the movable and the stationary members and adapted to oppose a displacement of the shaft, and means for allowing the shaft to rotate freely with respect to said movable member.

2. A device for suppressing axial oscillating movements of a rotating shaft, comprising a movable member connected with the shaft, a stationary member, a friction device interposed between the movable and the stationary members and adapted to oppose a displacement of the shaft, means allowing the shaft to rotate freely, and means for adjusting the pressure of the friction device.

3. A device for suppressing axial oscillating movements of a rotating shaft, comprising a bearing connected to and moved by the shaft, a stationary member, and a friction device interposed between the bearing and the stationary member and adapted to oppose a displacement of the shaft and the bearing.

4. A device for suppressing axial oscillating movements of a rotating shaft, comprising a hollow piston, means connecting the shaft and piston so as to allow a swinging movement of the shaft, a cylinder inclosing the piston, and a friction device interposed between the piston and the cylinder and adapted to oppose a displacement of the shaft.

5. A device for suppressing axial oscillating movements of a rotating shaft, comprising an axial bearing for the shaft adapted to allow a swinging movement thereof, a hollow piston forming the stationary part of said bearing, a cylinder inclosing the piston, and a friction device interposed between the piston and the cylinder and adapted to oppose axial displacement of the shaft.

6. A device for suppressing axial movements of a rotating shaft, comprising a means rotated by the shaft whose axial movements are to be damped, a pair of relatively movable members, a slip-joint which permits the transfer of one kind of movements from said means to one of the members and prevents others, and a friction means between the members to restrict relative movements thereof.

7. A device for suppressing axial movements of a rotating shaft, comprising a piston, a shaft, a bearing that connects the shaft with the piston and permits of a limited universal movement of one with respect to the other at the same time permitting the shaft to rotate, a cylinder for the piston, a friction device comprising a packing which is located between the piston and cylinder and is supported by one of them, a follower for subjecting the packing to pressure to change its effective action and a means for holding the follower in adjusted position.

8. A device for suppressing axial movements of a rotating shaft. comprising a piston and cylinder, a member adapted to be connected to the rotating shaft and the piston, a bearing that connects the member with the piston and permits the member to rotate independently of the piston and also to move it axially, a friction device between the piston and cylinder to restrict relative movements thereof, and an elastic means which subjects the friction device to a substantially constant pressure.

9. A device for suppressing axial movements of a rotating shaft, comprising a hollow piston and cylinder, a disk adapted to be rotated by the shaft, bearings on opposite sides of the disk having spherical surfaced members, seats for the members carried by the piston, and an adjustable packing device located between the adjacent surfaces of the piston and cylinder to restrict axial movements of one with respect to the other.

In testimony whereof we affix our signatures in presence of two witnesses.

FREDRIK LJUNGSTRÖM.
BIRGER LJUNGSTRÖM.

Witnesses:
 ELIN WAHMAN,
 G. CHAPRIAN